United States Patent [19]
Ledvina

[11] Patent Number: 5,653,653
[45] Date of Patent: Aug. 5, 1997

[54] HYDRAULIC TENSIONER WITH STOP MECHANISM

[75] Inventor: Timothy J. Ledvina, Groton, N.Y.

[73] Assignee: Borg-Warner Automotive, Inc., Sterling Heights, Mich.

[21] Appl. No.: 576,579

[22] Filed: Dec. 21, 1995

[51] Int. Cl.⁶ .................................................. F16H 7/08
[52] U.S. Cl. ........................................ 474/110; 474/111
[58] Field of Search ........................... 474/101, 110, 474/111, 140

[56] References Cited

U.S. PATENT DOCUMENTS

| | | | |
|---|---|---|---|
| 2,210,276 | 8/1940 | Bremer | 474/111 X |
| 3,232,129 | 2/1966 | Hopkins | 474/111 |
| 3,252,347 | 5/1966 | Seaman | 474/111 |
| 3,626,776 | 12/1971 | Staudinger et al. | 474/111 |
| 3,710,634 | 1/1973 | Tamaru et al. | 474/111 |
| 4,822,320 | 4/1989 | Suzuki | 474/111 |
| 4,874,352 | 10/1989 | Suzuki | 474/110 |
| 4,881,927 | 11/1989 | Suzuki | 474/110 |
| 5,006,095 | 4/1991 | Suzuki | 474/111 |
| 5,030,169 | 7/1991 | Kiso et al. | 474/110 |
| 5,073,150 | 12/1991 | Shimaya | 474/110 |
| 5,184,982 | 2/1993 | Shimaya et al. | 474/111 X |
| 5,346,436 | 9/1994 | Hunter et al. | 474/110 |
| 5,366,415 | 11/1994 | Church et al. | 474/110 |
| 5,366,417 | 11/1994 | Shimaya | 474/112 |
| 5,419,742 | 5/1995 | Shimaya | 474/112 |
| 5,577,970 | 11/1996 | Smith et al. | 474/135 X |

*Primary Examiner*—Roger J. Schoeppel
*Attorney, Agent, or Firm*—Hugh A. Abrams, Esq.; Greg Dziegielewski, Esq.

[57] ABSTRACT

A hydraulic chain tensioner has a stop mechanism. The tensioner includes a housing having a bore with a fluid filled chamber and a hollow piston slidably received within the bore and biased in a protruding direction by a spring. The housing has a set of teeth formed on the outside. The stop mechanism includes a rack that is connected to the piston and that extends along the side of the housing. The rack also has a set of teeth that engage the teeth of the housing.

7 Claims, 3 Drawing Sheets

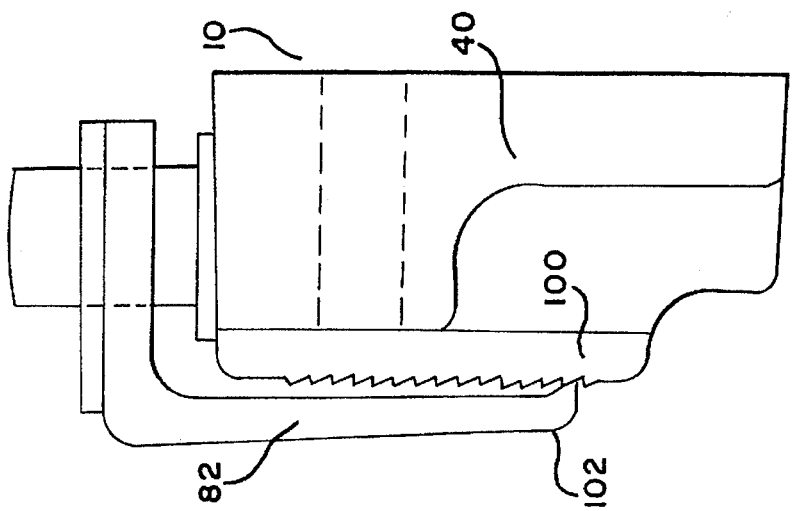
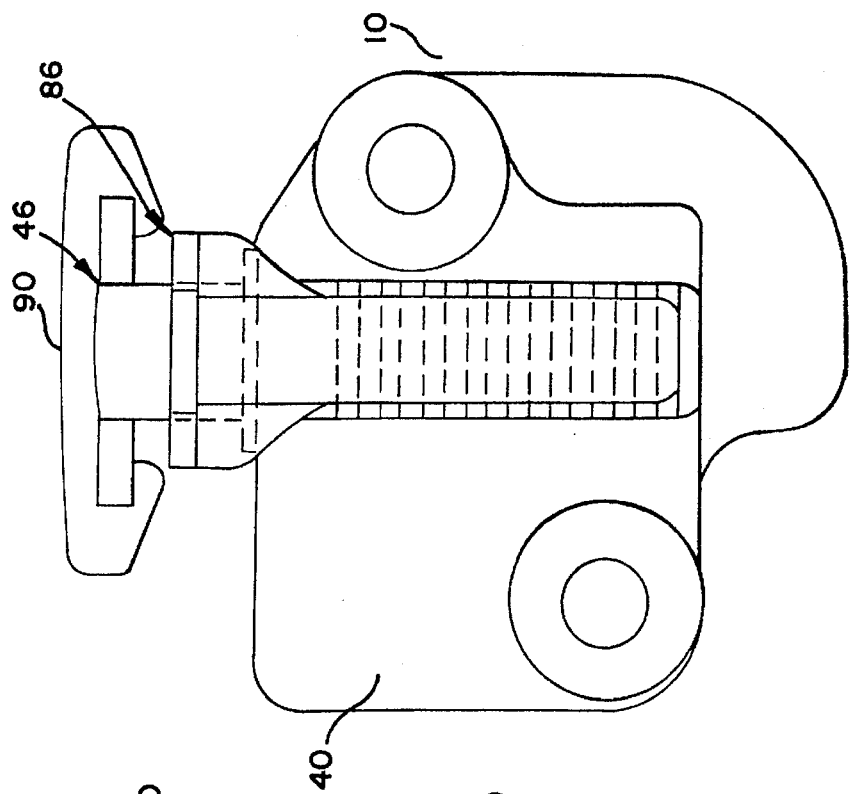
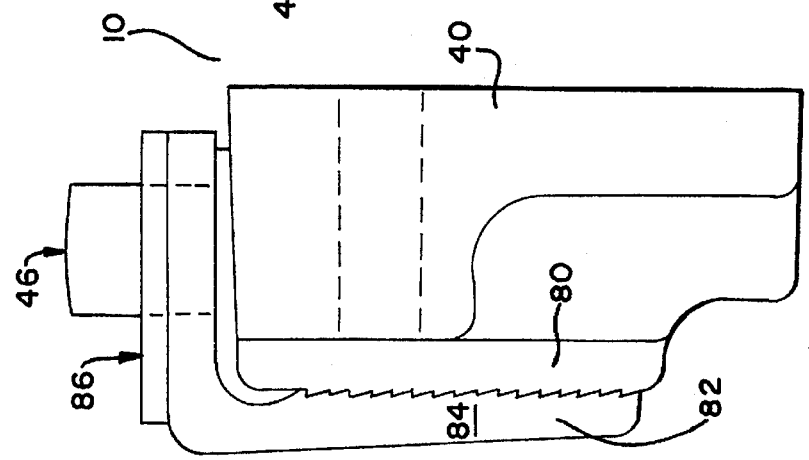

HYDRAULIC TENSIONER WITH STOP MECHANISM

BACKGROUND OF THE INVENTION

This invention relates generally to a hydraulic chain tensioner having a piston longitudinally movable in a housing and more particularly to a stop mechanism for such a tensioner.

Tensioning devices, such as hydraulic tensioners, are used as control devices for power transmission chains as a chain travels between a plurality of sprockets. In an automotive application, the tension of the chain can vary greatly due to the wide variation in the temperature and the linear expansion among the various parts of the engine. Moreover, wear to the chain components during prolonged use can produce a decrease in the tension of the chain. As a result, it is important to impart and maintain a certain degree of tension to the chain to prevent noise, slippage, or un-meshing of the chain teeth. It is especially important in the case of a chain-driven camshaft in an internal combustion engine to prevent the chain from slipping because the camshaft timing can be misaligned by several degrees, possibly rendering the engine inoperative or causing damage.

In a typical hydraulic tensioning device with a ball-type check valve, fluid flows from a reservoir through a clearance formed between the ball and the seat of a check valve. The hydraulic pressure from an external source, such as an oil pump or the like, flows into a chamber through passages formed in the housing, easily moving the piston outward by the combined efforts of the hydraulic pressure and the spring force.

On the other hand, when the piston tends to move in a reverse direction, the ball is tightly contacted with the ball seat to restrict the flow of fluid from the chamber, thereby preventing retraction of the piston. In this manner, the tensioner achieves a so-called no-return function, i.e., movements are easy in one direction (outward) but difficult in the reverse direction (inward).

A potential problem with hydraulic tensioners of this construction, however, is that they may not always maintain a predetermined tension, especially when an engine is being started or idling at rest with little or no oil pressure. Unless appropriate oil pressure is applied to the chamber, or the chamber is filled with a sufficient amount of oil, the piston moves easily in both directions and loses the no-return function, resulting in noises and vibrations during start-up conditions.

A solution to this potential problem is to provide the tensioner with a rack and ratchet assembly to act as a mechanical no-return device. U.S. Pat. No. 4,874,352 to Suzuki discloses a typical rack and ratchet system in which a rack is formed on the outer surface of the piston and a ratchet is supported in the housing and biased by a spring into meshing engagement with the rack. In this manner, the ratchet ensures that the piston will remain extended outward against tension from the chain or when oil pressure is low. A drawback to such large rack and ratchet systems located on the side of the piston is that the system creates a large hydraulic leak path that limits the effectiveness of tensioner operation.

Referring now to FIG. 7, there is shown a typical tensioner, as known in the prior art, incorporating the cumbersome rack and ratchet assembly, as disclosed in U.S. Pat. No. 4,874,352 to Suzuki. The tensioner 11 includes a housing 40 having a bore 42, which forms a fluid chamber 44 with a hollow piston 46. Preferably, the chamber 44 is a cylindrical bore. The chamber 44 is filled with fluid through passageway 48 from a pressure fluid source (not shown). The fluid source may be an oil pump, oil reservoir, or the like. Check ball 50 is biased toward the ball seat 52 by a ball spring 54 that abuts at one end against a retainer 56 to form a ball-type check valve. The ball-type check valve is provided between the chamber 44 and the passageway 48, and thus the source of fluid pressure, to permit fluid flow into the chamber while blocking fluid flow in the reverse direction. Fluid enters the chamber 44 formed by the bore 42 and hollow piston 46, as described below. The chamber 44 slidably receives the hollow piston 46, preferably cylindrical and having an upper end 58. The upper end 58 of the piston contacts the tensioner face, or shoe member (not shown). The shoe member provides tension along a chain/belt (not shown). A spring 60 contacts the inside of the upper end 58 of the piston 46 to bias the piston in a protruding or outward direction. The piston 46 is fitted with a rack 62 formed on the outer surface thereof. The rack 62 meshes with a ratchet 64 which is rotatably supported in the housing 40 and biased by a spring 66 in a direction opposite to the aforementioned protruding direction.

U.S. Pat. No. 5,346,436 to Hunter et al., which is owned by the assignee of the present application and which is incorporated herein by reference, discloses a rack and ratchet assembly that provides a mechanical no-return function. The rack and ratchet systems disclosed in both U.S. Pat. No. 5,346,436 and U.S. Pat. No. 4,874,352, however, are directed toward primary tensioners which are sized for substantial space requirements not typically available in secondary tensioners. The large size of such primary systems prevents their use on secondary tensioners which lack the substantial amount of space found in other hydraulic tensioners. A need, therefore, exists for a no-return mechanism for use on secondary tensioners.

The stop mechanism of the present invention is a simple and inexpensive apparatus for providing a secondary tensioner with a no-return mechanism. The stop mechanism may also be used on conventional tensioners, the advantages being reduced manufacturing complexity and the replacement by the stop mechanism of five parts found in a typical no-return mechanism. The stop mechanism includes a set of teeth formed on the outside of the tensioner housing and a rack that slips over the end of the piston and engages the teeth on the housing. The stop mechanism of the present invention lacks the ratchet of other no-return mechanisms. The advantage is that the stop mechanism of the present invention is smaller and more compact. This construction allows for use of a no-return mechanism on a secondary tensioner where there are substantial space constraints.

SUMMARY OF THE INVENTION

The present invention is directed to a secondary hydraulic tensioner having a stop mechanism. The tensioner includes a housing having a bore and a hollow piston slidably received within the bore to form a fluid filled chamber. The piston is biased in a protruding direction by a spring. A stop mechanism, which acts as a no-return mechanism, is provided to ensure that the piston will remain extended outward against tension from the chain or when oil pressure is low. The stop mechanism preferably includes a set of teeth formed on the outside of the tensioner housing and a locking mechanism, or rack, also having a set of teeth, that slips over the end of the piston and engages the teeth formed on the housing. The teeth are designed to permit the piston to move outward from the tensioner housing but to lock up when the tensioner retracts. The rack may be formed of reinforced plastic molding or spring steel stamping. Additionally, the ends of the teeth on the outside of the housing may be formed with a release mechanism that prevents the tensioner from extending until the tensioner is fitted to the engine and the engine is started for the first time.

The tensioner of the present invention in its preferred embodiment is a secondary tensioner. That is, the tensioner is typically utilized in a camshaft-to-camshaft chain drive of a dual overhead camshaft engine. A secondary tensioner may be mounted in a variety of orientations, including upside down, i.e., the piston extends downward when extending out from the bore.

In a preferred embodiment of the tensioner, the rack is an L-shaped member that extends from the top of the piston alongside the housing such that the teeth of the rack mesh with the teeth formed on the outside of the tensioner housing. More preferably, the L-shape of the rack is varied such that the rack creates an acute angle (less than 90 degrees) between the top and the side of rack. The angle on the rack provides spring action against the teeth on the housing. The rack is preferably secured to the piston by a plate placed just above the rack, leaving a small gap between the plate and the rack. The small gap between the plate and the rack allows the piston to move without the teeth of the rack engaging the next tooth of the housing. The plate presses the rack so that the teeth on the rack engage the teeth on the outside of the tensioner housing.

In a second preferred embodiment, there is only one tooth formed on the outside of the tensioner housing. The tooth is preferably located at the bottom of the housing. The rack is formed from a piece of spring steel and also has only a single tooth that engages the single tooth on the outside of the tensioner housing.

In another embodiment, a groove is created by designing two shoulders on the piston such that the plate that is pressed onto the piston engages the first shoulder, which is smaller in diameter than the second shoulder. If the length of the second shoulder, which is spaced further from the end of the piston than the first shoulder, is greater than the thickness of that of the rack, then a dead band will be created that allows a range of motion for the piston to move without the piston either extending the rack so as to engage the next tooth of the teeth on the tensioner housing or locking up in the reverse direction.

The foregoing and other features and advantages of the present invention will become apparent from the following detailed description of the presently preferred embodiments and the accompanying drawings.

BRIEF DESCRIPTION OF THE DRAWINGS

FIG. 2 is a schematic illustrating a first preferred embodiment of a hydraulic tensioner incorporating the stop mechanism of the present invention.

FIG. 3 is a sectional view of the preferred embodiment of a hydraulic tensioner incorporating the stop mechanism of the present invention.

FIG. 4 is a schematic illustrating a second preferred embodiment of a hydraulic tensioner incorporating the stop mechanism of the present invention.

DETAILED DESCRIPTION OF THE INVENTION AND PRESENTLY PREFERRED EMBODIMENTS

Figure 1:
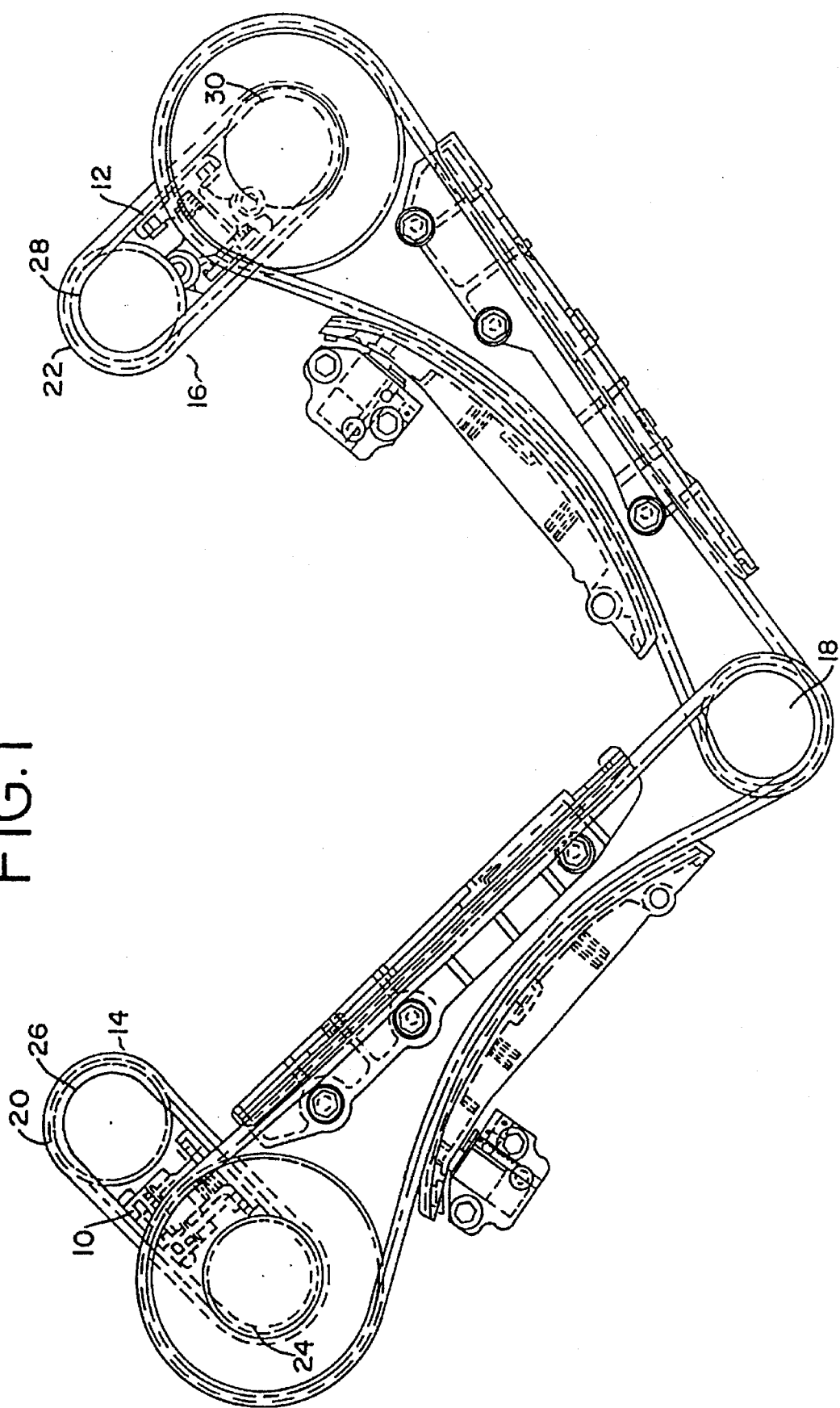
FIG. 1 is a schematic illustrating a timing chain system with dual overhead camshafts and a camshaft-to-camshaft drive system.
Figure 5:
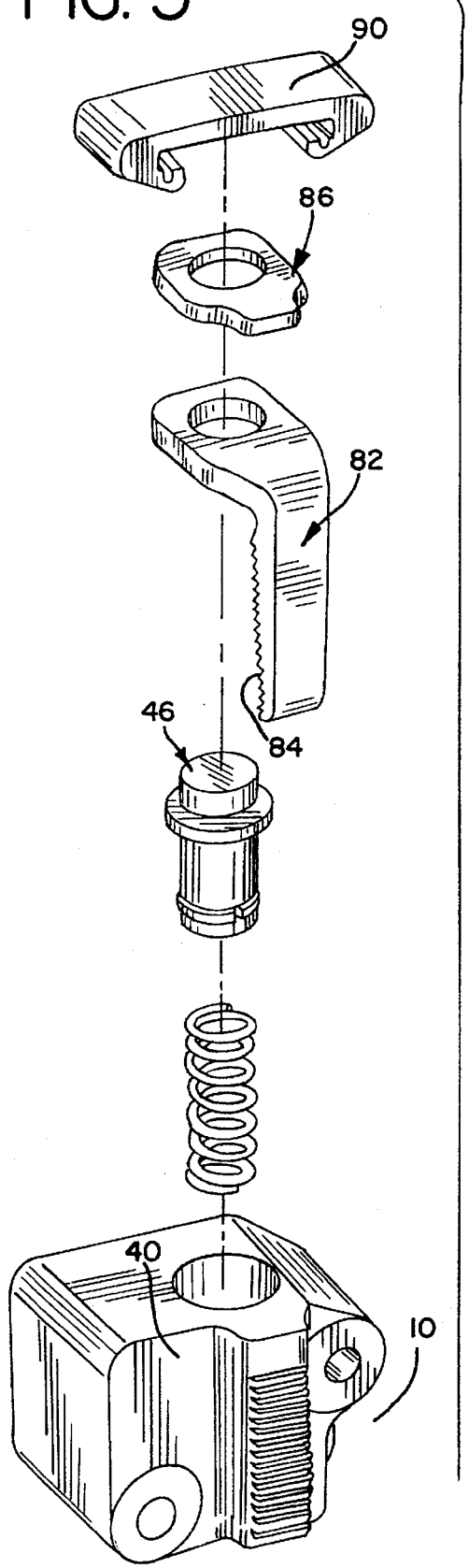
FIG. 5 is an exploded view of a hydraulic tensioner incorporating the stop mechanism of the present invention.

Turning now to the drawings, FIG. 1 illustrates two hydraulic tensioners 10 and 12 positioned in opposite directions in a timing chain system with dual overhead camshafts 14 and 16 and a camshaft-to-camshaft drive system driven by a crankshaft 18. Chains 20 and 22 are wrapped about sprockets 24, 26, 28 and 30 of the camshafts. The tensioners 10 and 12 are provided to maintain chain tension in the camshaft-to-camshaft drive system.

FIG. 2 illustrates a first preferred embodiment of the hydraulic chain tensioner 10 incorporating the stop mechanism of the present invention. In this embodiment, a set of teeth 80 is formed on the outside of the tensioner housing 40. A rack 82 slips over the end of the piston 46. The rack 82 is preferably formed from reinforced plastic molding or spring steel stamping. The rack 82 is provided with a set of teeth 84 that meshes the set of teeth 80 located on the outside of the housing 40 when the rack 82 is slipped over the end of the piston 46. Preferably, a plate 86 is connected to the top of the piston 46 to retain the rack 82 in place. The plate 86 is secured to the piston 46 just above the rack 82 such that a small gap is left between the plate 86 and the rack 82. The gap between the plate 86 and the rack 82 allows the piston 46 and rack 82 to move without engaging the next tooth of the housing 40.

Referring now to FIG. 3, there is shown a sectional view of a first preferred embodiment of the hydraulic tensioner 10 incorporating the stop mechanism of the present invention. In this embodiment, the plate 86 is press fit onto the piston 46. The upper end of the piston 46 contacts the tensioner face, or shoe member 90, which provides tension along a chain/belt (not shown).

FIG. 4 illustrates a second preferred embodiment of a hydraulic tensioner 10 incorporating the stop mechanism of the present invention. In this embodiment, the tensioner housing 40 has a set of teeth 100 formed on the outside. The rack 82 is formed from a piece of spring steel, and has only a single tooth 102 that engages the teeth 100 on the outside of the tensioner housing 40.

Figure 6:
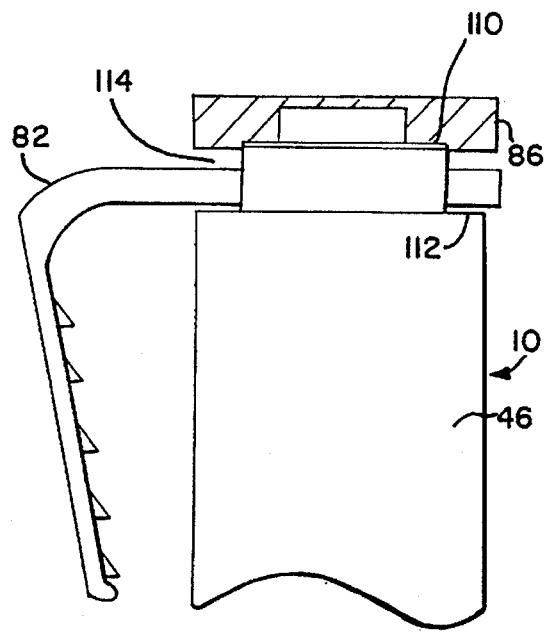
FIG. 6 is a schematic illustrating the groove created in another embodiment of the stop mechanism of the present invention.
Figure 7:
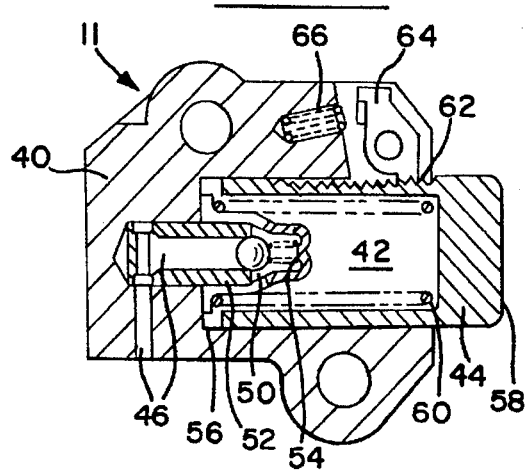
FIG. 7 is a sectional view of a hydraulic tensioner of the prior art.

Referring now to FIG. 6, there is shown a third embodiment of a hydraulic tensioner 10 incorporating the stop mechanism of the present invention. In this embodiment, the piston has a first shoulder 110 and a second shoulder 112. The first shoulder 110, which is larger in diameter than the second shoulder 112, is spaced closer to the upper end of the piston 46 than is the second shoulder 112. The plate 86 is secured to the piston 46 such that the plate 86 engages the first shoulder 110. The length of the second shoulder 112 is preferably greater than the thickness of the rack 82, creating a groove, or dead band, 114. The dead band 114 provides the piston 46 with a range of motion so that the piston 46 may move without extending the rack 82 so as to engage the next tooth of the set of teeth on the outside of the tensioner housing or without locking up in the reverse direction.

At engine start-up, the high pressure fluid opens the check valve and flows into the chamber formed by the hollow interior of the piston and the bore of the housing. As the fluid fills the chamber, the piston is moved outward by the force of the pressurized fluid and the spring. The piston continues to move outward until the inward force of the chain on the piston balances the outward force of the spring and fluid. At this point, the ball check valve closes and prevents further fluid flow. When oil pressure decreases and the chain forces the plunger inward, the rack holds the piston in position. Thus, the rack prevents the piston from retracting when oil pressure decreases. Even when fluid pressure is low or does not exist, such as at engine start-up, the no-return function is retained by operation of the stop mechanism of the present invention.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic chain tensioner comprising:

a housing having a generally cylindrical bore;

a hollow piston slidably received within said bore to define a fluid chamber with said bore;

a spring biasing the piston in the protruding direction from said bore;

a check valve to permit the flow of fluid from an external source through the valve and into a fluid chamber;

a set of teeth formed onto the outside of said housing;

a rack with a set of teeth connected to said piston, said rack extending alongside said housing and engaging the teeth located on the outside of the housing; and a plate press fit onto said piston and secured to top of said rack.

2. The tensioner of claim 1 wherein said rack comprises an L-shaped member extending from the top of the piston and alongside said housing and engaging the teeth on the outside of said housing.

3. The tensioner of claim 2 wherein an acute angle is formed between said top and said side of said rack.

4. The tensioner of claim 3 wherein said rack is formed from reinforced plastic molding.

5. The tensioner of claim 3 wherein said rack is formed from a spring steel stamping.

6. The tensioner of claim 1 wherein the top of said piston contacts a shoe member.

7. A hydraulic chain tensioner comprising:

a housing having a generally cylindrical bore;

a hollow piston slidably received within said bore to define a fluid chamber with said bore;

a spring biasing the piston in the protruding direction from said bore;

a check valve to permit the flow of fluid from an external source through the valve and into a fluid chamber;

a set of teeth formed onto the outside of said housing;

a rack, being formed of spring steel and having a single tooth, connected to said piston and extending alongside said housing and engaging said teeth located on the outside of said housing; and a plate affixed on to of said rack and connected at the top of said piston.

* * * * *